(12) United States Patent  
Ogura et al.

(10) Patent No.: US 7,047,109 B2
(45) Date of Patent: May 16, 2006

(54) MACHINERY FOR IMPROVING PERFORMANCE IRREGULARITIES ARISING FROM VIBRATIONS

(75) Inventors: Katsuyuki Ogura, Utsunomiya (JP); Hirotada Anzai, Utsunomiya (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 10/841,224

(22) Filed: May 7, 2004

(65) Prior Publication Data

US 2004/0267407 A1    Dec. 30, 2004

(30) Foreign Application Priority Data

May 13, 2003    (JP)    ............... 2003-134434

(51) Int. Cl.
*G05B 13/00*    (2006.01)

(52) U.S. Cl. .................. 700/280; 702/56; 248/638

(58) Field of Classification Search ............... 700/280; 74/570, 574, 618, 649, 572.2, 574.1, 574.4; 702/56; 248/562, 638

See application file for complete search history.

(56) References Cited

U.S. PATENT DOCUMENTS

| | | | | |
|---|---|---|---|---|
| 5,086,564 A | * | 2/1992 | Schalz | 248/638 |
| 5,553,514 A | * | 9/1996 | Walkowc | 74/574 |
| 6,140,790 A | * | 10/2000 | Heine et al. | 318/611 |
| 2002/0104950 A1 | * | 8/2002 | Mayama | 248/638 |

OTHER PUBLICATIONS

English translation of Japanese Patent Abstract Publication No. 2000-216082 published Aug. 4, 2000, 26 pages.
English translation of Japanese Patent Abstract Publication No. 2000-243811 published Sep. 8, 2000, 20 pages.
English translation of Japanese Patent Abstract Publication No. 2001-118773 published Apr. 27, 2001, 40 pages.
English translation of Japanese Patent Abstract Publication No. 2001-230178 published Aug. 24, 2001, 32 pages.
English translation of Japanese Patent Abstract Publication No. 2002-170765 published Jun. 14, 2002, 24 pages.
English translation of Japanese Patent Abstract Publication No. 2002-175963 published Jun. 21, 2002, 25 pages.

* cited by examiner

*Primary Examiner*—Leo Picard
*Assistant Examiner*—Charles Kasenge
(74) *Attorney, Agent, or Firm*—Rankin, Hill, Porter & Clark LLP (57) ABSTRACT

A machinery is disclosed that comprises a movable body that moves linearly with respect to a main body and an active damper for controlling an inherent vibration of the movable body occurred in a direction of movement of the movable body, the active damper comprising a sensor, provided with the movable body, for detecting the inherent vibration currently occurred in the direction of movement of the movable body, among one or a plurality of the inherent vibrations of the movable body; an actuator, provided with the movable body, for generating a vibration in the direction of movement of the movable body; and a controller for allowing the actuator to generate the vibration having a negative phase relationship with respect to the inherent vibration detected by the sensor.

11 Claims, 5 Drawing Sheets

MACHINERY FOR IMPROVING PERFORMANCE IRREGULARITIES ARISING FROM VIBRATIONS

RELATED APPLICATIONS

This application claims priority to the Japanese Patent Application 2003-134434 dated on May 13, 2003 and is hereby incorporated with reference for all purposes.

BACKGROUND OF THE INVENTION

1. Field of the Invention

The present invention relates generally to machinery, and more particularly, to improvement of a damping mechanism of the machinery.

2. Prior Art

Precision instruments such as coordinate measuring machine are provided with movable bodies. Although these types of precision instruments require high speed and high precision, vibrations more easily occur with increases in speed and precision. Precision instruments in particular require improvements in relation to performance irregularities. In the precision instruments, there are the performance irregularities arising from the vibrations occurred by the instruments. If these vibrations can be suppressed, the speed and precision of the precision instruments can be further increased.

In the prior art, in order to increase the speed and precision of precision instruments, damping vibrations by using elastic rubber or springs had been considered.

Also in the prior art, although there is technology that negates the reaction force during stage movement, using this to increase the speed and precision of precision instruments can also be considered (for example, Japanese Patent Application Laid-Open Publication Nos. 2002-170765, 2002-175963, 2001-230178, 2001-118773, 2000-243811 and 2000-216082). This prior art technology, for example, provides a mass that is equivalent to that of the stage. This prior art technology, by linearly moving the mass in the direction opposite to the direction of movement of the stage using reactive force during movement of the stage, negates the reaction force during stage movement.

However, even if the elastic rubber, etc., or the prior art methods described in the aforementioned patent documents are used to increase the speed and precision of precision instruments, a satisfactory damping effect cannot be attained.

In seeking to further increase the speed and precision of precision instruments, there is a limit to the increase the speed and precision because more vibrations are occurred. In precision instruments, although there is still room for improvement in performance irregularities due to vibrations, there has been no suitable technology that can solve this problem in the prior art.

SUMMARY OF THE INVENTION

The present invention was conceived in light of the above problem of the prior art, and the object thereof is to provide a machinery that can improve performance irregularities arising from vibrations.

The machinery of the present invention to achieve the above object is a machinery comprising a movable body and an active damper. The active damper comprises a sensor, an actuator and a controller.

In this case, the movable body moves linearly with respect to the main body.

The active damper controls an inherent vibration of the movable body occurred in a direction of movement of the movable body.

The sensor is provided with the movable body. The sensor detects the inherent vibration currently occurred in the direction of movement of the movable body, among one or a plurality of the inherent vibrations of the movable body.

The actuator is provided with the movable body. The actuator generates a vibration in the direction of movement of the movable body.

The controller allows the actuator to generate the vibration having a negative phase relationship with respect to the inherent vibration detected by the sensor.

For the inherent vibration of the movable body of the present invention, the inherent vibration possessed by the movable body with respect to a reference point within the movable body, already attained in a state where the movable body is not being moved, is cited as an example.

The negative phase vibration referred to herein is, with regard to phase, the vibration that has a negative phase with respect to the phase of the inherent vibration of the movable body. With regard to frequency, it has the same frequency as that of the inherent vibration possessed by the movable body. With regard to amplitude, it has a sign that is the opposite to that of the amplitude of the inherent vibration possessed by the movable body, and a size (absolute value) that is the same as that of the amplitude of the inherent vibration of the movable body.

Inherent vibrations of the movable body referred to herein include those that have an inherent single (resonance) frequency, or a plurality of different (resonance) frequencies.

Measurement precision, repetition precision, and movement precision are cited as examples of the performance of the machinery of the present invention.

In the present invention, the active damper is continuously operated. The sensor continuously detects the inherent vibration of the movable body currently occurred in the direction of movement of the movable body. The actuator continuously generates the vibration in the direction of movement of the movable body. The controller preferably allows the actuator to continuously generate the vibration having the negative phase relationship with respect to the inherent vibration detected by the sensor.

In the present invention, the movable body is provided with at least the sensor and the actuator of the active damper. In the present invention, the machinery further comprises a memory. The controller acquires, from the memory, a control information to the actuator that is optimum for damping the inherent vibration detected by the sensor. The controller preferably allows the actuator to generate the vibration based on the acquired control information.

In this case, the memory stores a relationship between information, acquired beforehand in a state where the movable body is not being moved, relating to one or a plurality of the inherent vibrations of the movable body, and the control information to the actuator that is optimum for generating the vibration having the negative phase relationship with respect to the inherent vibration of the movable body.

In the present invention, the machinery preferably comprises an adapter.

In this case, the adapter is removably provided with the movable body. The adapter holds at least the sensor and the actuator of the active damper.

In the present invention, the actuator comprises a pair of flywheels and a motor. The controller preferably allows the motor to perform the speed of rotation control of the flywheels so that the flywheels generate the vibration in the negative phase relationship with respect to the inherent vibration detected by the sensor.

In this case, the flywheels are rotatable in opposite directions at an equivalent speed, for generating the vibration having the negative phase relationship with respect to the inherent vibration detected by the sensor in the direction of movement of the movable body.

The motor rotates the flywheels at the speed of rotation determined based on a frequency of the inherent vibration detected by the sensor.

In the present invention, the movable body is a probe of a coordinate measuring machine. At least the sensor and the actuator of the active damper are provided with the probe of the coordinate measuring machine.

As used herein, providing the sensor and the actuator in the probe of the coordinate measuring machine includes providing the sensor and the actuator directly in the probe, and providing the sensor and the actuator on a spindle for attachment to the probe.

The coordinate measuring machine of the present invention is called a three-dimensional coordinate measuring machine. The three-dimensional coordinate measuring machine is provided with mutually perpendicular guides, and a scale and the probe that obtain the movement amount of the guides. The coordinate measuring machine can thereby obtain three-dimensional coordinate values for the probe based on the obtained movement amount.

The probe of the coordinate measuring machine of the present invention is a detector for detecting the three-dimensional coordinates of points on an object to be measured. Types of probes available are contact type and non-contact type probes.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENT

The preferred embodiment of the present invention will be described hereunder with reference to the drawings.

Figure 1:
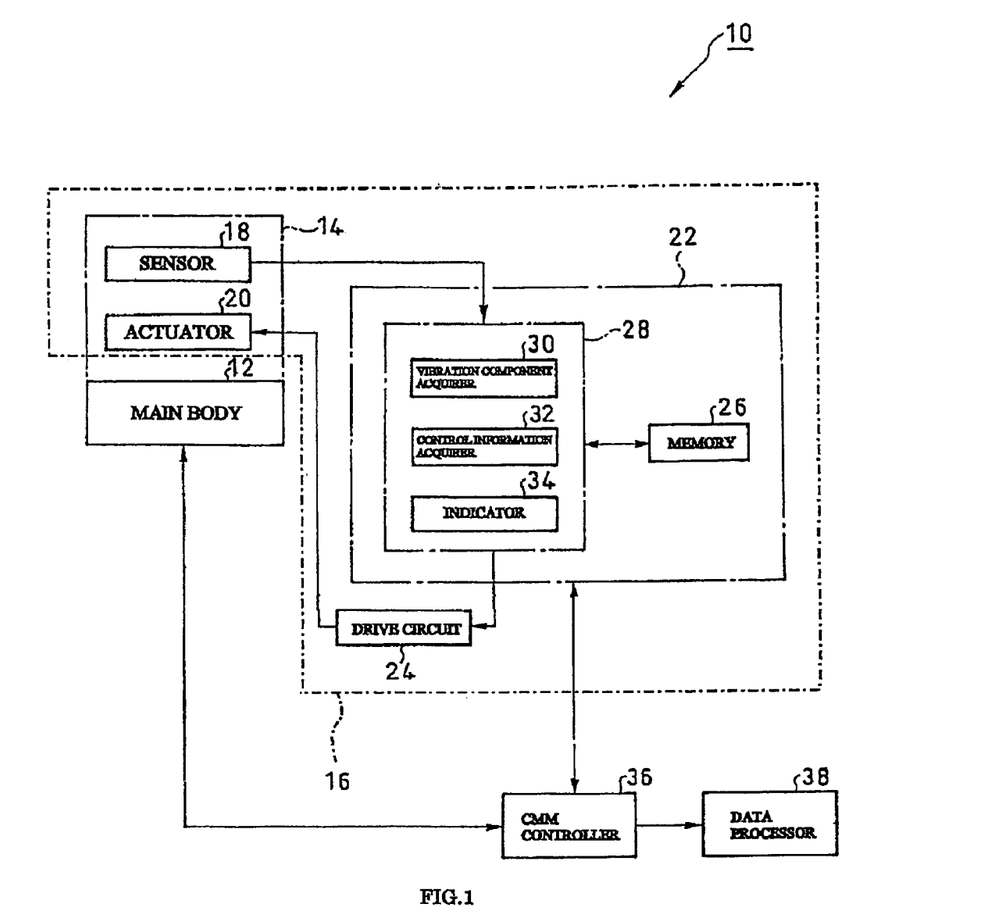
FIG. 1 is an explanatory diagram of a schematic structure of the machinery according to an embodiment of the present invention.

FIG. 1 shows a schematic structure of a machinery according to an embodiment of the present invention.

In the present embodiment, as a movable body that is to be damped, a Z axis spindle that moves in an X axis direction in a state where it is provided with a probe of a coordinate measuring machine will be assumed. An example wherein damping of the inherent vibration in the X axis direction of the probe is performed will be explained.

The coordinate measuring machine (machinery) 10 shown in the drawing is provided with coordinate measuring machine main body (main body) 12, a Z axis spindle (movable body) 14, and an active damper 16.

Here, the Z axis spindle 14 moves linearly in an X axis direction (direction of movement) with respect to the coordinate measuring machine main body 12.

The active damper 16 is provided with a sensor 18, an actuator 20, and a controller 22. The sensor 18 and the actuator 20 are provided at the tip portion of the Z axis spindle 14.

The active damper 16 controls inherent vibrations possessed by the Z axis spindle 14 that occur in the X axis direction, which is the direction of movement, of the Z axis spindle 14.

The sensor 18 includes a vibration acceleration sensor or the like. The sensor 18 is provided at the tip portion of the Z axis spindle 14 to which a probe (omitted from the drawing) is attached. The sensor 18 continuously detects, among single or plural inherent vibrations possessed by the Z axis spindle 14, an inherent vibration component (vibration frequency, phase, amplitude, etc.) currently occurring in the X axis direction of the Z axis spindle 14. Signals from the sensor 18 are sequentially input to the controller 22.

The actuator 20 is provided with the Z axis spindle 14. The actuator 20 continuously generates a vibration in the X axis direction of the Z axis spindle 14, thereby continuously vibrating the Z axis spindle 14.

The controller 22 is provided with a memory 26 and a CPU 28. The CPU 28 comprises a vibration component acquirer 30, a control information acquirer 32 and an indicator 34. The controller 22 controls the movement of the actuator 20 via a drive circuit 24. That is, the controller 22 continuously generates, with respect to the actuator 20, a vibration having a negative phase relationship with respect to the inherent vibration currently generated in the Z axis spindle 14, acquired by the sensor 18.

Here, the memory 26 stores a relationship between one or a plurality of inherent vibrations of the Z axis spindle 14, and control information for the actuator 20 suitable for generating a vibration having a negative phase relationship with respect to the inherent vibration of the tip portion of the Z axis spindle 14, already acquired in a state where the Z axis spindle 14 is not being moved.

In the present embodiment, a vibration is generated by the actuator 20 in a state where the Z axis spindle 14 is not being moved. While changing the frequency of the vibration generated by the actuator 20, the vibration amplitude thereof is monitored by the sensor 18. The controller 22, when the peak of the vibration amplitude monitored by the sensor 18 exceeds a threshold, stores the frequency at that time in the memory 26 as the inherent frequency of the Z axis spindle 14.

The vibration component acquirer 30 continuously acquires components (frequency, amplitude and/or phase) of the inherent vibration currently occurred in the Z axis spindle 14 based on a signal from the sensor 18.

The control information acquirer 32 acquires from the memory 26 control information for the actuator 20 suitable for damping of the inherent vibration currently occurred in the Z axis spindle 14, acquired from the sensor 18.

The indicator 34 continuously generates a vibration with respect to the actuator 20 according to control information acquired from the control information acquirer 32.

In the present embodiment, a CMM controller 36 and data processor 38 are provided.

The CMM controller 36 comprises, for example, a computer. The CMM controller 36 performs numerical control, by means of the computer, of movement along each axis of the coordinate measuring machine main body 12, and measurement operations.

The data processor 38 obtains necessary dimensions such as hole diameters, hole positions and level differences of the object being measured, based on X, Y and Z coordinates obtained by the measurement operations of the coordinate measuring machine main body 12.

The coordinate measuring machine 10 according to the present embodiment is constructed roughly as above, and its operation will be explained below.

In the present embodiment, having as its object to improve irregularities in the measuring precision of the coordinate measuring machine 10, an active damper 16 is provided at the tip of the Z axis spindle 14. Also, in the present embodiment, a vibration having a negative phase relationship with respect to the inherent vibration of the coordinate measuring machine main body 12 is applied to the tip portion of the Z axis spindle 12. Because in the present embodiment the inherent vibration of the coordinate measuring machine main body 12 can thereby be greatly reduced, increasing the precision of the coordinate measuring machine 10 can be reliably achieved.

That is, a probe is provided with the tip portion of the Z axis spindle 14 of the coordinate measuring machine main body 12. The measuring element of the probe tip acquires X, Y and Z coordinates in the instant that it is in contact with the object being measured, whereby measurement of coordinates is performed.

In this type of coordinate measuring machine 10, residual vibration after high speed movement of the Z axis spindle 14 and vibration during low speed movement when measuring in particular become problems.

In other words, when attempting high speed positioning of the probe in proximity to measurement sites on the object being measured, an acceleration G is applied when accelerating at the commencement of high speed positioning. Further, a deceleration G is applied to the probe when decelerating. These kinds of external forces are the causes of vibration of the Z axis tip portion at times of high speed movement.

Thereafter, when the measuring element of the probe is placed in contact with the object being measured at low speed, X, Y and Z coordinates are read at the time of contact, and relative movement of the probe is immediately stopped. When measuring by this kind of fine movement, minute vibrations occur, therefore irregular errors often occur in the measured values.

Thus, in the present embodiment, the sensor 18 and the actuator 20 are provided at the tip portion of the Z axis spindle 14. In the present embodiment, by imparting a vibration having a negative phase relationship to the minute vibration occurring at the tip portion of the Z axis spindle 14 at least when commencing deceleration and during low speed movement of the Z axis spindle 14, it is preferable to perform active control with respect to the Z axis spindle 14.

In other words, the controller 22, in order to suppress residual vibration after high speed movement of the Z axis spindle 14, performs active control of the Z axis spindle 14 when decelerating after high speed movement.

Also, after positioning, because the Z axis spindle 14 approaches the object being measured at measuring speed, there is a possibility that some vibration will remain at this time. In order to remove low speed vibration that may occur in the Z axis spindle 14 when measuring, the controller 22 performs active control of the Z axis spindle 14 even when it moves at measuring speed.

By thus performing active control of the Z axis spindle 14, the inherent vibration currently occurred in the tip portion of the Z axis spindle 14 and the vibration applied to the actuator 20 cancel each other out. The inherent vibration occurred in the Z axis spindle 14 is thereby, theoretically, zero.

As a result, in the present embodiment, the vibration occurred in the Z axis spindle 14 can be greatly reduced during point measurement when residual vibration after high speed movement of the Z axis spindle 14 is particularly problematic, and during scanning measurement when vibration during low speed measurement is particularly problematic.

Consequently, in the present embodiment, because irregularities in the measuring precision of the coordinate measuring machine 10 occurring due to vibration of the Z axis spindle 14 can be improved, increasing the precision of the coordinate measuring machine 10 can be achieved.

Continuous Operation

The inventors of the present invention, as a result of examining the timing at which the active controller is operated, found that although operating the actuator 20 (for example, immediately performing damping when deceleration of the Z axis spindle 14 commences and/or during low speed movement) only when oscillation is detected in at least the Z axis spindle 14 is important, in the present embodiment, continuously operating the active damper 16 is more important. The reason for this is that, in the actuator 20, there are times when it is difficult to control transient states from a state where damping control is performed (state where actuator 20 is operating) to a state where damping control is not performed (state where actuator 20 is not operating).

Thus, what is characteristic about the present embodiment is that the sensor 18 is continuously operated and vibrations generated by the actuator 20 are continuously controlled. Also, according to the inventors of the present invention, having confirmed that inherent vibration is continuously generated in the Z axis spindle 14, it is particularly preferable for the active damper 16 to be continuously operated.

As a result, in the present embodiment, the sensor 18 continuously detects inherent vibrations currently generated in the X axis direction of the Z axis spindle 14 of the coordinate measuring machine 10.

The actuator 20 continuously generates vibrations in the X axis direction.

The controller 22 continuously generates in the actuator 20 a vibration having a negative phase relationship to the inherent vibration currently occurred in the Z axis spindle 14 and detected by the sensor 18 from moment to moment.

As a result, in the present embodiment, compared to a case where the actuator 20 is operated only when vibration is detected, active damping by the actuator 20 with respect to the Z axis spindle 14 can be more reliably and easily performed.

Oscillation

The inventors of the present invention, as a result of conducting examinations of a more preferred active damper, found that correctly distinguishing whether changes in the signal waveform from the sensor 18 are due to acceleration G/deceleration G of the Z axis spindle 14, or due to oscillation, is important. Also, they understood that it is particularly preferable to perform this distinction before controlling damping. By doing this, in the present embodiment, more favorable active damping can be performed based on the signal from the sensor 18.

Hereunder, an example where active damping is performed based on oscillation of the signal from the sensor 18 will be explained in detail.

That is, if the rigidity of the Z axis spindle 14 is extremely high and vibrations do not often occur in the Z axis spindle 14, the sensor 18 outputs only the acceleration G or deceleration G. However, because this is not oscillation, it is preferable that the new damping control instruction by the controller 22 to the actuator 20 be performed after detection of oscillation.

For this reason the controller 22 continuously monitors the existence of changes in the signal waveform from the sensor 18. In the present embodiment, when there is a change in the signal waveform from the sensor 18, it determines whether that change is due to vibration or acceleration.

In the present embodiment, the controller 22 determines whether changes in the signal waveform from the sensor 18 are due to oscillation based on whether a vibration frequency corresponding to the frequency of the inherent vibration of the Z axis spindle 14 is stored in the memory 26.

In other words, the controller 22, if there is vibration frequency information within the memory 26 corresponding to the signal waveform of the signal from the sensor 18, determines that in this case the change in signal is due to oscillation. On the other hand, if there is no vibration frequency information within the memory 26 corresponding to the signal waveform of the signal from the sensor 18, the controller 22 determines that in this case the change in signal is not due to oscillation.

Then, if oscillation is not detected with respect to the signal waveform from the sensor 18, the controller 22 continues using the control information from immediately before as is, without changing the control information to the actuator 20. On the other hand, if an oscillation different to that immediately before is detected with respect to the signal waveform from the sensor 18, the controller 22 acquires from the memory 26 the optimum control information for damping the inherent vibration that differs to that from immediately before. Then, the controller 22 generates a vibration in the actuator 20 based on the newly acquired control information.

In this way the controller 22, based on the signal waveform from the sensor 18, continuously monitors changes in the inherent vibration of the Z axis spindle 14 currently being occurred. Then, if it detects a different oscillation, the controller 22 immediately performs optimum operation control of the actuator 20 according to that inherent vibration. Thereby, in the present embodiment, compared to a machinery that has no device for determining oscillation, active damping of the Z axis spindle 14 is performed more reliably.

Adapter

The inventors of the present invention, as a result of examining how to mount the active damper on the coordinate measuring machine main body, found that adapting at least the sensor and the actuator is particularly preferable. As a result, in the present embodiment, the flexibility with which the active damper is provided to the coordinate measuring machine main body has been improved.

Hereunder, adaptation of the sensor and the actuator will be described in detail.

Figure 2:
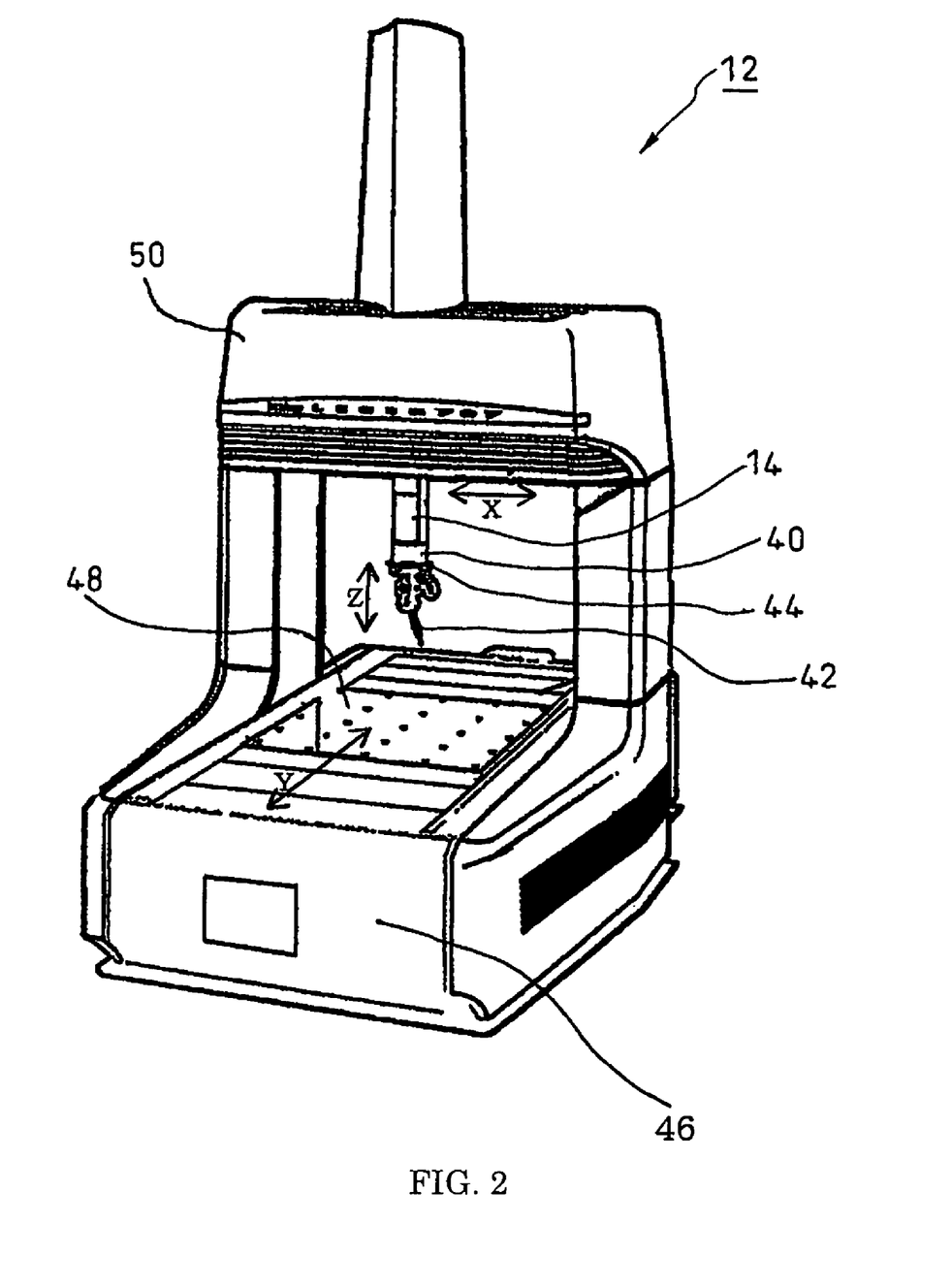
FIG. 2 shows a specific example where the active damper according to an embodiment of the present invention is provided with a coordinate measuring machine.

FIG. 2 shows a preferred example of mounting the active damper according to the present embodiment on the coordinate measuring machine main body 12.

In the drawing, in the active damper, the sensor and the actuator are detachably provided at the tip portion of the Z axis spindle 14 in a state where they are held within an adapter 40.

In the present embodiment, the upper portion of the adapter 40 is detachably formed in the lower portion of the Z axis spindle 14. The lower portion of the adapter 40 is detachably formed in a probe adapter 44.

In this way, the adapter 40 that holds the active damper is freely detachable with respect to the Z axis spindle 14. Thereby, the active damper 16 of the present embodiment is easily attached not only to an exclusive coordinate measuring machine, but to existing coordinate measuring machines.

As a result, compared to a fixed type active damper 16, in the present embodiment flexibility with respect to existing coordinate measuring machines has been improved. Irregularities in measurement precision can thereby be improved in more coordinate measuring machines.

[Coordinate Measuring Machine Main Body]

The coordinate measuring machine main body 12 is provided with a main body base 46, a measuring table 48, and a column 50 fixed to the main body base 46.

The measuring table 48 is provided so as to be movable in the Y direction with respect to the man body base 46. The measuring table 48 moves the object being measured in the Y direction.

The Z axis spindle 14 is provided so as to be movable in the X and/or Z directions with respect to the column 50. The Z axis spindle 14 moves the probe 42 in the X and/or Z directions.

Here, in the present embodiment, the probe 42 moves in the X direction and the inherent vibration of the probe 42 is occurred in the X direction. Therefore in the present embodiment the inherent vibration in the X direction is damped.

Because the inherent vibration of the probe 42 occurs in the X direction in this way, the actuator is vibrated in the X direction.

In the present embodiment, in order to at least remove residual vibration after high speed movement of the Z axis spindle 14 (during high speed movement in the X direction of the probe 42), active control is performed when decelerating after high speed movement.

Also, in the present embodiment, in order to at least remove low speed vibration during low speed measurement by the Z axis spindle 14 (during low speed movement in the X direction of the probe 42), active damping is performed when moving at measuring speed.

Actuator

The inventors of the present invention, as a result of conducting investigations regarding the actuator, found that using a flywheel is particularly preferred.

Alternatively, in the present embodiment, a pneumatic or hydraulic direct drive cylinder can also be used.

However, using a rotating body such as a flywheel as the actuator is excellent from the viewpoint of ease of design and manufacture, therefore this is more preferable.

Also, compared to a direct drive body as the actuator, a rotating body that can use the rotation of a motor as is can be easily designed and manufactured. In addition, although using a direct drive body driven by a linear motor as the actuator can also be considered, because a linear guide is necessary the structure becomes complicated and damping becomes difficult.

Thus, in the present embodiment, using a flywheel in particular as the actuator is preferable.

As a result, controlling vibrations in a single direction can be performed with high efficiency and a simple structure, therefore design and manufacture are easy.

Figure 3:
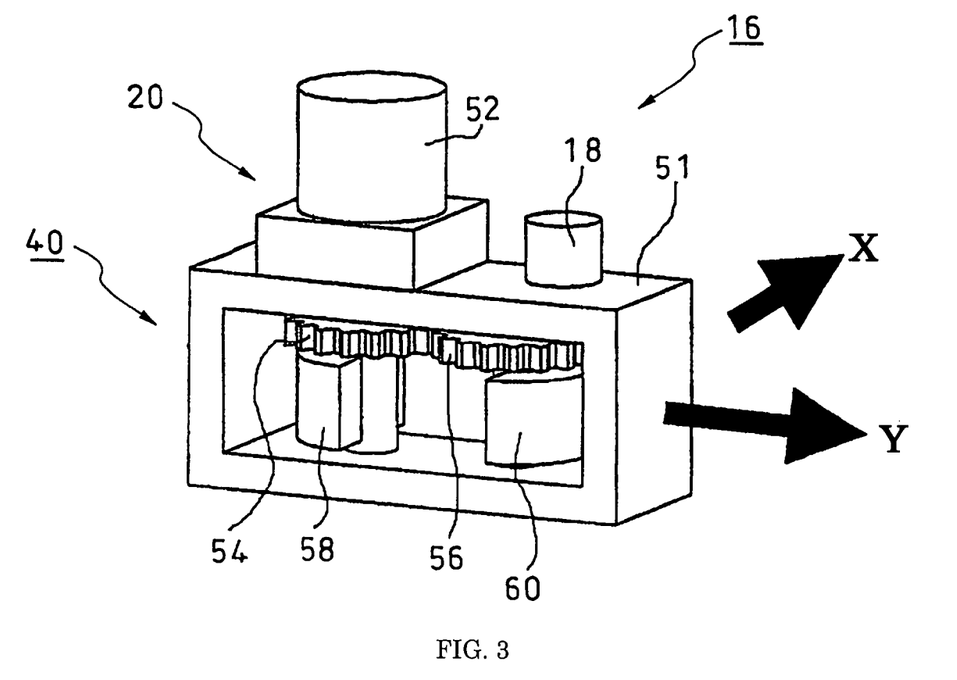
FIG. 3 is a specific explanatory diagram of the active damper according to an embodiment of the present invention.

In FIG. 3, an active damper using a flywheel that is preferably used in the present embodiment is shown.

The adapter 40 shown in the drawing is provided with a base frame 51, an actuator 20 and a sensor 18. In the base frame 51 are held the actuator 20 and the sensor 18.

The sensor 18 detects oscillation with respect to the base frame (a reference point) 51.

The actuator 20 is provided with a motor 52 having its axis of rotation in the Z direction, a pair of gears 54 and 56 having axes of rotation in the Z direction, and a pair of flywheels 58 and 60 having their axes of rotation in the Z direction.

In this actuator 20, the gear 54 and flywheel 58 are provided on the axis of rotation of the motor 52.

The rotation of the motor 52 is transferred to the flywheel 58 and to the flywheel 60 via the gears 54 and 56.

Consequently, the flywheels 58 and 60 rotatably operate in opposite directions at the same speed. The flywheels 58 and 60 can thereby generate in the X direction a vibration having a negative phase relationship to the inherent vibration (the inherent vibration currently occurred in the Z axis spindle) obtained by the sensor 18.

Here, the controller controls the rotation of the flywheels 58 and 60 by means of the motor 52 so that the flywheels 58 and 60 rotate at a frequency determined based on the frequency of the inherent vibration (the frequency of the inherent vibration of the Z axis spindle currently being occurred) detected by the sensor 18.

Limit of the Direction of Vibration

Because the coordinate measuring machine according to the present embodiment employs a table movement type, the Z axis spindle 14 occurs vibration in mainly the X axis direction. Consequently, in the present embodiment, the arrangement of the flywheels 58 and 60 is as shown in FIGS. 4A to 4D. Vibration of the actuator 20 can thereby be aligned to the X axis direction which is the direction of the vibration of the Z axis spindle.

Figure 4A:
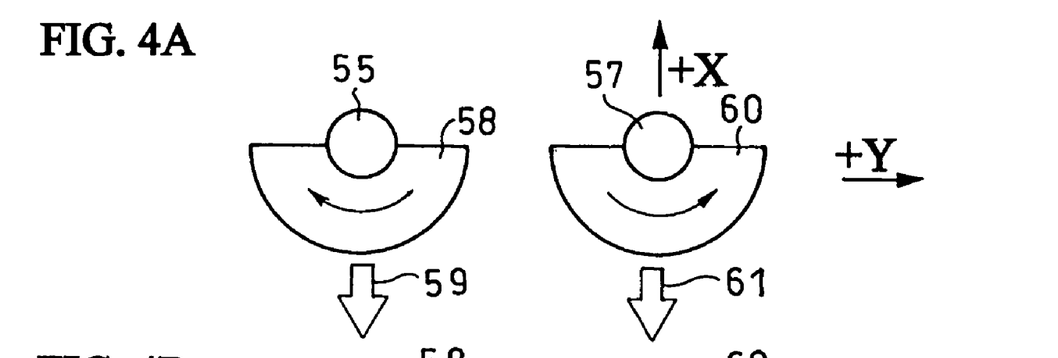
FIGS. 4A, 4B, 4C and 4D are explanatory diagrams of the posture characteristics of flywheels that form the active damper shown in FIG. 3.

In other words, the flywheels 58 and 60 are pivoted in the same eccentric state, and rotatably operate in opposite directions around rotation shafts 55 and 57. Here, when the flywheels 58 and 60 are in attitude 1 as shown in FIG. 4A, moments 59 and 61 are generated in the negative direction to the X direction. For this reason double moment in the direction negative to the X direction is generated in the actuator.

Figure 4B:
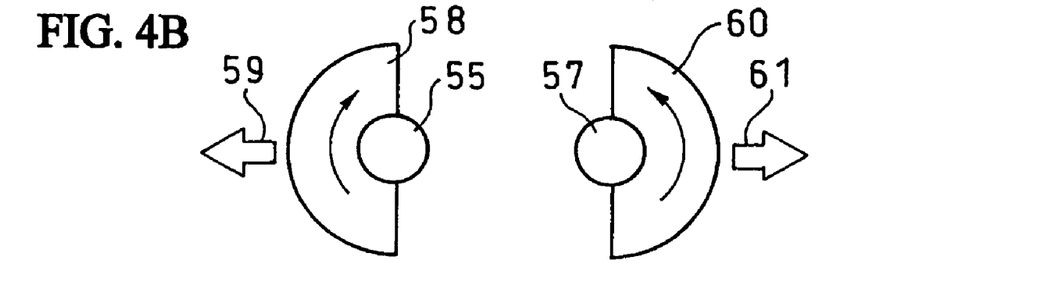

On the other hand, when the flywheels 58 and 60 are in attitude 2 as shown in FIG. 4B, moments 59 and 61 cancel each other out in the Y direction. As a result moment is zero in FIG. 4B.

Figure 4C:
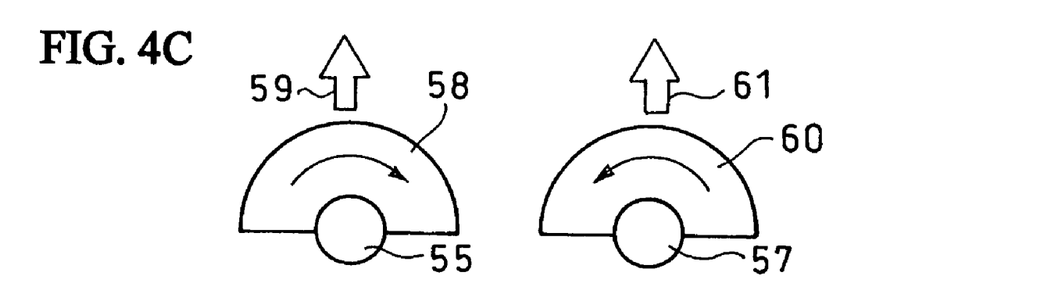

Then, when the flywheels 58 and 60 are in attitude 3 as shown in FIG. 4C, moments 59 and 61 are generated in the positive direction to the X direction. For this reason, in FIG. 4C, double moment in the direction positive to the X direction is generated in the actuator.

Figure 4D:
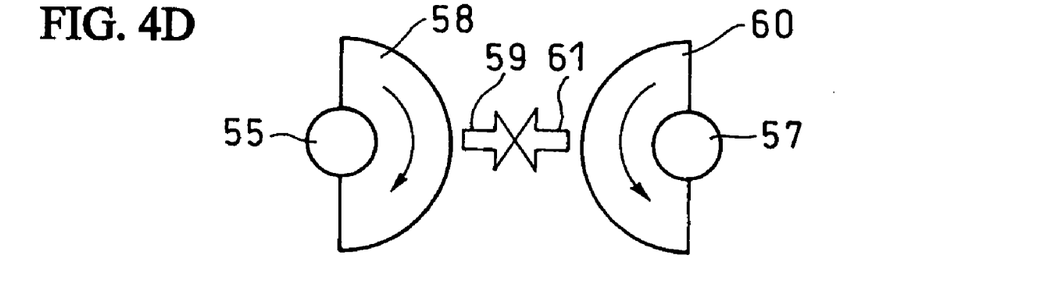

On the other hand, when the flywheels 58 and 60 are in attitude 4 as shown in FIG. 4D, moments 59 and 61 cancel each other out in the Y direction. As a result moment is zero in FIG. 4D.

By rotating the flywheels 58 and 60, moment is cyclically generated in the positive and negative direction of the X direction, and vibration is thereby generated in the actuator. As a result, in the present embodiment, by employing the arrangement of flywheels 58 and 60 shown in the drawings, the actuator can only generate vibrations in the positive and negative directions of the X direction.

Therefore, in the present embodiment, using the vibration in only the positive and negative directions of the X direction of the actuator thus obtained, the following damping is performed.

Figure 5A:
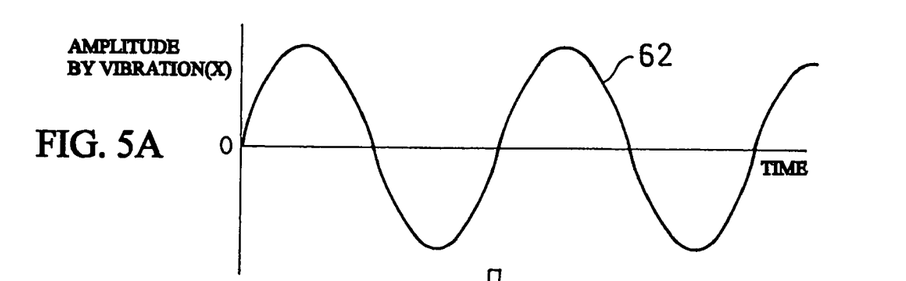
FIGS. 5A, 5B and 5C are explanatory diagrams of the damping principle of the active damper according to an embodiment of the present invention.
Figure 5B:
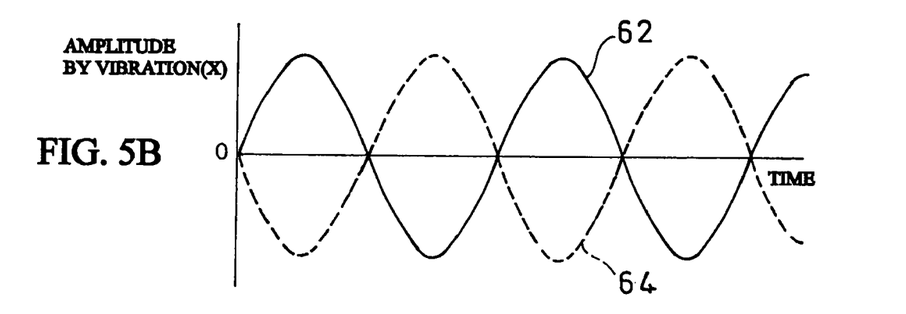

That is, when the inherent vibration signal 62 as shown in FIG. 5A is detected by the sensor, a vibration signal 64 having a negative phase relationship to the inherent vibration signal 62 as shown in FIG. 5B is generated in the actuator.

Then, the peak part of one vibration component is positioned at the trough part of the other vibration component. As a result of this, the inherent vibration currently being occurred and the vibration of the actuator cancel each other out.

Figure 5C:
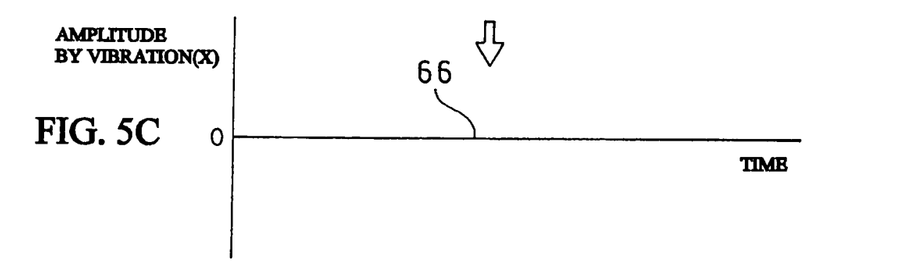

As a result, the vibration currently occurred in the Z axis spindle theoretically has an amplitude of zero as shown in FIG. 5C and disappears.

[Synchronization]

The controller, in order to perform the aforementioned active damping control, must synchronize the inherent vibration signal 62 from the sensor and the angular speed of the motor. The controller can thereby generate in the actuator a signal 64 of a vibration having a negative phase relationship with respect to the signal 62 of the inherent vibration from the sensor, as shown in FIG. 5B.

[Speed of Rotation]

The vibration occurred at the tip portion of the Z axis spindle is inherent to that structure. Therefore in the present embodiment, a vibration that may occur in the tip portion of the Z axis spindle is detected beforehand by the sensor. Then, the frequency components and size of the vibration that may occur in the tip portion of the Z axis spindle are calculated. In the present embodiment, it is preferable to select the size of the flywheels to match the size of the detected vibration.

The frequencies of the flywheels are preferably adjusted by the rotational speed of the motor. That is, by adjusting the speed of rotation of the motor based on the inherent vibration frequency at which the Z axis spindle vibrates, the rotational speed of the flywheels can be adjusted. Therefore in the present embodiment the mass and amount of imbalance of the flywheels can be decided based on the moment of inertia in the speed of rotation.

[Shapes of the Flywheels]

In the present embodiment, any type of shape can be used as the flywheel shape. However, semicircular shapes are preferred as the shapes of the flywheels in the present embodiment from the viewpoint that they are excellent in terms of ease of processing.

[Continuous Operation]

In particular when flywheels are used, it is difficult to control transient states from a state where damping control is performed (state where the flywheels are rotating) to the state where damping control is not performed (state where the flywheels are not rotating).

Therefore, in particular in an actuator using flywheels, operating the sensor continuously and controlling the rotation of the flywheels continuously is more preferable.

According to the coordinate measuring machine of the present embodiment described above, at least the sensor and the actuator of the active damper are provided with the Z axis spindle tip portion. Then, a vibration having a negative phase relationship to the inherent vibration possessed by the coordinate measuring machine is applied to the Z axis spindle tip portion.

As a result, the inherent vibrations of machines can be greatly reduced. Consequently, because irregularities in the measuring precision of coordinate measuring machines which may occur due to vibration can be improved, increased precision of coordinate measuring machines can be achieved.

Furthermore, in the present embodiment, by merely attaching the active damper, irregularities in the measuring precision of coordinate measuring machines can be improved without increasing the rigidity of the structure. Thereby, the performance of coordinate measuring machine can be improved at low cost.

Incidentally, the present invention is not limited to the above structure, and various modifications are possible within the scope of the gist of the invention.

For example, in the above structure, an example was explained wherein an active damper was provided with respect to a coordinate measuring machine. However, the present invention is not limited to this and can be applied to anything if it is a machinery that is provided with a movable body. The present invention can also be favorably applied to a variety of machinery from coordinate measuring machines to, for example, coordinate measuring machines, machining tools, general processing machines, and positioning devices.

Also, in the present embodiment, an example using control by means of rotating flywheels as the actuator was explained. However, the actuator of the present embodiment is not limited to this structure, and any structure that can perform damping with respect to a weight having a predetermined mass by imparting a vibration having a negative phase relationship with the inherent vibration of a movable body is permissible. At this time, the weight is one to which a vibration is applied by a piezoelectric element, a pneumatic or hydraulic piston or an electromagnetic drive source such as voice coil.

Further, an example in which the inherent vibration of the movable body occurs in only one axial direction and the vibration for damping it was also generated in the same direction was explained. However, the present invention is not limited to this, and the vibration direction can be two axial directions (vibration within a plane) or three axial directions (solid vibration). In other words, in the present invention, a negative phase vibration having a negative phase, the same amplitude and the same cycle with respect to the inherent vibration is generated in the actuator so that the inherent vibration having the vibration direction, amplitude and cycle detected by the sensor is canceled.

According to the machinery of the present invention as explained above, an active damper is provided for controlling an inherent vibration possessed by a movable body currently occurred in the direction of movement of the movable body. As a result, in the present invention, irregularities in the performance of machinery can be improved.

Also in the present invention, the active damper is continuously operated. Thereby, irregularities in the performance of machinery can be further improved in the present invention.

Further, in the present invention, in order to generate a vibration in a negative phase relationship to the inherent vibration of a movable body detected beforehand, a memory for storing optimum control information for the actuator is provided. Thereby, in the present invention improvement of irregularities in the performance of machinery can be more easily and reliably executed.

Moreover, in the present invention the sensor and the actuator are held in an adapter. Improvement of irregularities in performance can thereby be carried out in more machinery in the present invention.

Further still, flywheels are used as actuators in the present invention. Irregularities in the performance of machinery can thereby be improved more cheaply.

Yet further still, in the present invention the active damper is provided with respect to a probe of a coordinate measuring machine. Thereby, in the present invention irregularities in the performance of coordinate measuring machines can be improved.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A machinery comprising:
   a movable body, which is to be damped, that moves linearly in a direction of movement with respect to a main body; and
   an active damper for controlling an inherent vibration of the movable body occurring in the direction of movement of the movable body, the active damper comprising:
   a sensor, secured to the movable body, for detecting the inherent vibration currently occurring in the direction of movement of the movable body, among one or a plurality of inherent vibrations of the movable body;
   an actuator, secured to the movable body, for generating a vibration in the direction of movement of the movable body; and
   a controller for allowing the actuator to generate the vibration having a negative phase relationship with respect to the inherent vibration detected by the sensor; and
   a memory for storing a relationship between information, acquired beforehand in a state where the movable body is not being moved, relating to one or a plurality of inherent vibrations of the movable body, and a control information to the actuator that is optimum for generating the vibration having the negative phase relationship with respect to the inherent vibration of the movable body, and wherein the controller acquires, from the memory, the control information for the actuator that is optimum for damping the inherent vibration in the direction of movement detected by the sensor, and allows the actuator to generate the vibration based on the acquired control information.

2. The machinery according to claim 1, wherein the active damper is continuously operated, wherein the sensor continuously detects the inherent vibration of the movable body currently occurring in the direction of movement of the movable body, wherein the actuator continuously generates the vibration in the direction of movement of the movable body, and wherein the controller allows the actuator to continuously generate the vibration having the negative phase relationship with respect to the inherent vibration detected by the sensor.

3. The machinery according to claim 1, further comprising: an adapter, said adapter holding at least the sensor and the actuator of the active damper and being removably secured to the movable body.

4. A machinery comprising:
a movable body, which is to be damped, that moves linearly in a direction of movement with respect to a main body; and
an active damper for controlling an inherent vibration of the movable body occurring in the direction of movement of the movable body, the active damper comprising:
a sensor, secured to the movable body, for detecting the inherent vibration currently occurring in the direction of movement of the movable body, among one or a plurality of inherent vibrations of the movable body;
an actuator, secured to the movable body, for generating a vibration in the direction of movement of the movable body, the actuator comprising:
at least a pair of flywheels, rotatable in opposite directions at an equivalent speed, for generating the vibration having the negative phase relationship with respect to the inherent vibration detected by the sensor in the direction of movement of the movable body; and a motor for rotating the flywheels at the speed of rotation determined based on a frequency of the inherent vibration detected by the sensor, wherein the controller allows the motor to perform the speed of rotation control of the flywheels so that the flywheels generate the vibration in the negative phase relationship with respect to the inherent vibration detected by the sensor; and
a controller for allowing the actuator to generate the vibration having a negative phase relationship with respect to the inherent vibration detected by the sensor.

5. The machinery according to claim 1, wherein the actuator comprises: at least a pair of flywheels, rotatable in opposite directions at an equivalent speed of rotation, for generating the vibration having the negative phase relationship with respect to the inherent vibration detected by the sensor in the direction of movement of the movable body; and a motor for rotating the flywheels at the speed of rotation determined based on a frequency of the inherent vibration detected by the sensor, wherein the controller allows the motor to perform the speed of rotation control of the flywheels so that the flywheels generate the vibration in the negative phase relationship with respect to the inherent vibration detected by the sensor.

6. The machinery according to claim 3, wherein the actuator comprises: at least a pair of flywheels, rotatable in opposite directions at an equivalent speed of rotation, for generating the vibration having the negative phase relationship with respect to the inherent vibration detected by the sensor in the direction of movement of the movable body; and a motor for rotating the flywheels at the speed of rotation determined based on a frequency of the inherent vibration detected by the sensor, wherein the controller allows the motor to perform the speed of rotation control of the flywheels so that the flywheels generate the vibration in the negative phase relationship with respect to the inherent vibration detected by the sensor.

7. The machinery according to claim 1, wherein the movable body is a probe of a coordinate measuring machine, and wherein at least the sensor and the actuator of the active damper are secured directly to the probe of the coordinate measuring machine.

8. The machinery according to claim 2, wherein the movable body is a probe of a coordinate measuring machine, and wherein at least the sensor and the actuator of the active damper are secured directly to the probe of the coordinate measuring machine.

9. The machinery according to claim 3, wherein the movable body is a probe of a coordinate measuring machine, and wherein at least the sensor and the actuator of the active damper are secured directly to the probe of the coordinate measuring machine.

10. The machinery according to claim 4, wherein the movable body is a probe of a coordinate measuring machine, and wherein at least the sensor and the actuator of the active damper are secured directly to the probe of the coordinate measuring machine.

11. The machinery according to claim 4, wherein the active dampener is continuously operated, wherein the sensor continuously detects the inherent vibration of the movable body currently occurring in the direction of the movement of the movable body, wherein the activator continuously generates the vibration in the direction of movement of the movable body, and wherein the controller allows the actuator to continuously generate the vibration having the negative phase relationship with respect to the inherent vibration detected by the sensor.

* * * * *